INVENTOR.
Warren H. DeLancey
BY
Chester A. Williams

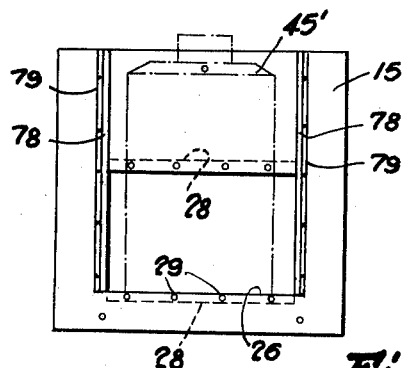
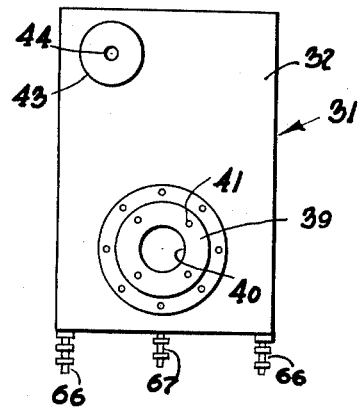
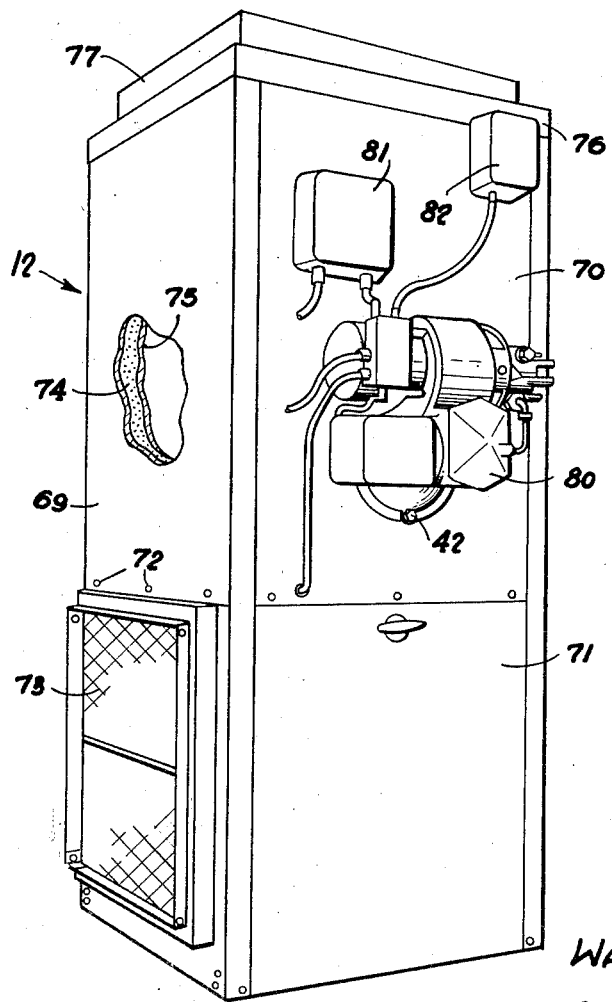

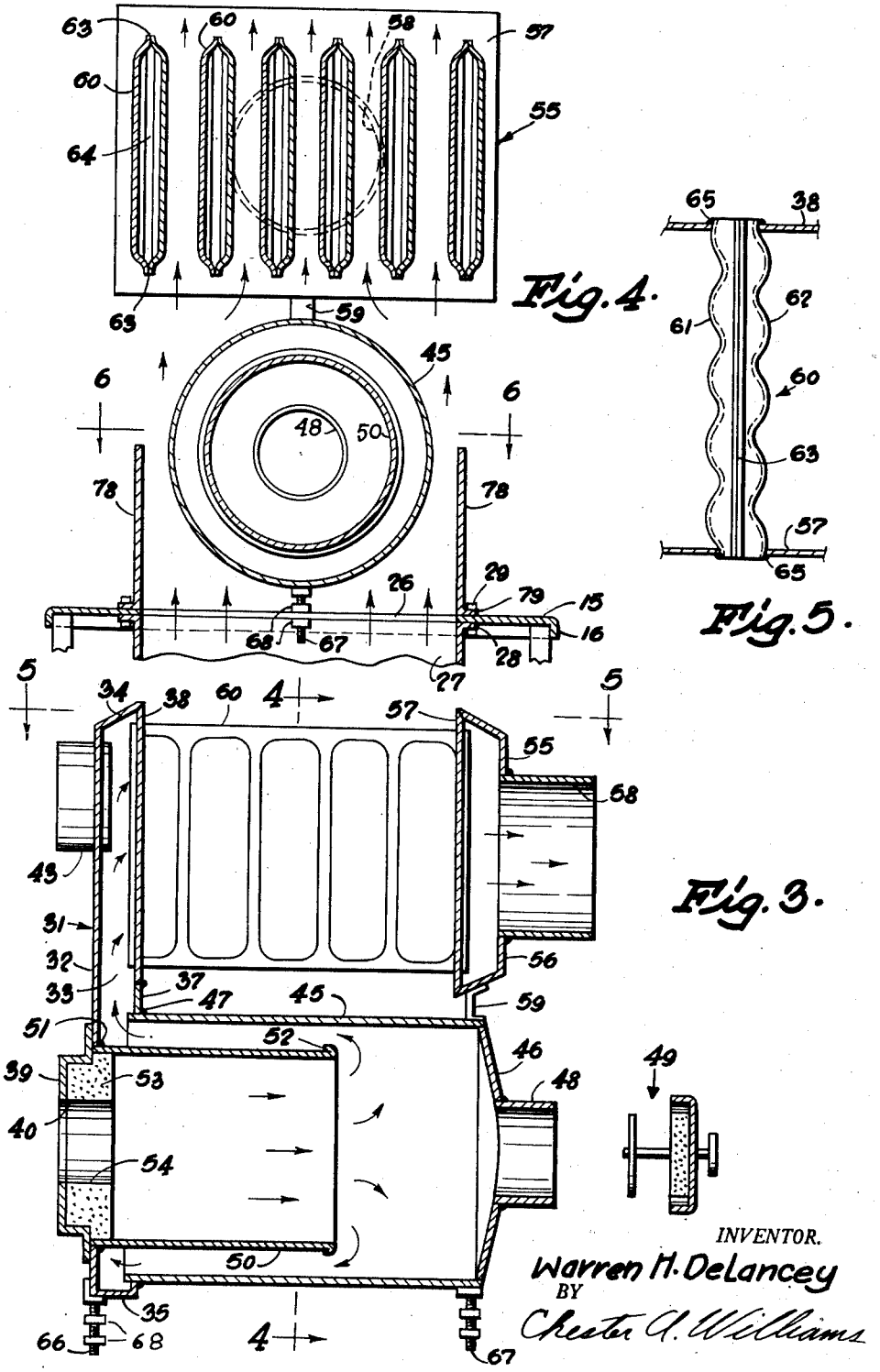

Patented June 5, 1951

2,555,842

UNITED STATES PATENT OFFICE 2,555,842

AIR HEATING FURNACE AND HEAT EXCHANGE STRUCTURE THEREFOR

Warren H. De Lancey, Springfield, Mass., assignor to Atlantic Development Company, Inc., Springfield, Mass., a corporation of Massachusetts Application June 24, 1949, Serial No. 101,010

11 Claims. (Cl. 126—110)

The present invention relates to warm air furnaces of the type particularly adapted for heating residential houses and small industrial establishments.

A primary object of the present invention is to provide a warm air furnace which is extremely compact but, at the same time, is a highly efficient heat exchanger unit.

A further object of this invention is to provide a warm air furnace which is particularly designed so that its various component parts may be simply and speedily constructed by automatic machines and thereafter, assembled together in a most simple and efficacious manner, to the end that the total man-hours required for its manufacture is maintained at a minimum figure.

A still further object of this invention is to provide a warm air furnace which is made up of several unitary component parts, including a factory-tested heat exchanger unit, which component parts may be conveniently shipped to the building in which the furnace is to be operated, and thereafter be assembled by relatively unskilled persons.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby may be readily understood by those skilled in the art.

In the accompanying drawings,

Fig. 1 represents a perspective view of a warm air furnace incorporating the present invention.

Fig. 3 represents a sectional view of the heat exchanger unit taken substantially along the line 3—3 of Fig. 2.

Fig. 4 represents a sectional view of the heat exchanger unit taken substantially along the line 4—4 of Fig. 3.

Fig. 5 represents a fragmentary sectional view taken substantially along the line 5—5 of Fig. 3, and disclosing, in top plan, one of the several flue elements employed in the present unit.

Fig. 6 represents, on a reduced scale, a sectional view taken substantially along the line 6—6 of Fig. 4.

Fig. 7 represents, on a reduced scale, a front elevation view of the heat exchanger unit.

Figure 2:
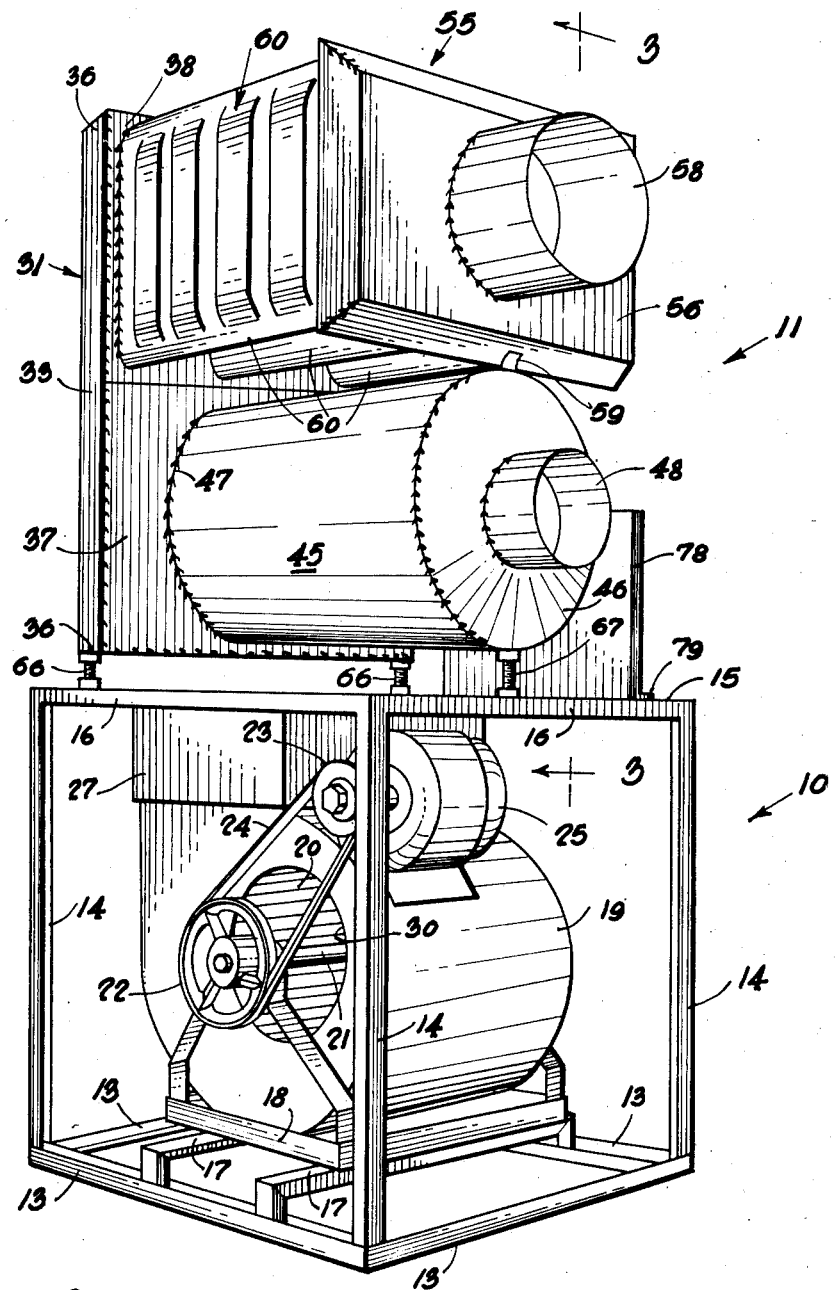
Fig. 2 represents, on an enlarged scale, a perspective view of the rear and right side of the warm air furnace shown in Fig. 1, but with the insulated covering panels removed therefrom.

Referring now to the drawings which illustrate a preferred embodiment of the invention, the present heating apparatus consists essentially of two basic units these being an air blower structure and a heat exchanger unit designated respectively by the numerals 10 and 11. Referring particularly to Figs. 1 and 2, it is to be understood that the air blower structure 10 is adapted to be supported directly upon a floor, while the heat exchanger unit 11 is adapted to be secured upon the upper portion of the structure 10. As will be described hereinafter in more detail, the superimposed furnace units 10 and 11 are provided with insulated panels which, when properly erected, form a furnace encompassing shell which is generally designated in Fig. 1 by the numeral 12.

Referring first to Fig. 2, the present air blowing structure comprises a substantially open framework including a rectangular base made up of horizontally disposed interconnected frame members 13, 13. Projecting upwardly from the four corners of this base are four upright elements 14, 14, only three of which are disclosed in Fig. 2. Secured upon the upper end portions of the upright elements 14, 14 is a substantially flat cover or table element 15, the marginal edge portions of which are bent downwardly, as at 16, to lend rigidity to the structure. The various component elements of the framework may be welded, or otherwise suitably connected together, in a conventional manner.

Carried upon a pair of the four oppositely disposed frame members 13, 13 are a pair of horizontally spaced stringer elements 17, 17 which, in turn, support a bracket structure or cradle generally designated by the numeral 18. Nested within the bracket structure 18 in a conventional manner is a centrifugal type blower comprising a scroll casing 19 in which is rotatably mounted a fan 20. This fan is carried upon a shaft 21, the opposite end portions of which are journaled in bearings carried by the brackets 18. One end portion of the shaft 21 is provided with a drive pulley 22 which is connected with a motor drive pulley 23 by means of a conventional V-belt 24. An electric motor 25 may be pivotally mounted by means not herein disclosed to the blower casing 19, and the motor shaft carries the pulley 23 for the purpose of driving the fan 20.

Referring particularly to Figs. 2, 4, and 6, the upper or table portion 15 of the structure 10 is provided with a substantially rectangular opening 26, to the edge portions of which are secured the four sides of an air directing conduit 27, This conduit 27 preferably of rectangular open ended box-like form, has its lower edges connected with the upwardly-directed discharge opening of the air blower casing 19. As disclosed in Figs. 4 and 6, the upper edge portions 28 of the conduit 27 may be bolted, or otherwise suitably secured, as at 29, to the table or platform 15. As noted above, the air blower is of a conventional centrifugal type, and it is adapted to draw air through its oppositely opposed axial openings 30, only one of which is disclosed herein, and this air is discharged upwardly through the conduit 27 and the platform opening 26.

The above-noted heat exchanger unit 10 comprises a relatively thin vertically elongated and rectangular-shaped primary header box which is generally designated by the numeral 31. Referring particularly to Figs. 2, 3 and 7, this primary header box comprises a vertically disposed front plate 32 having its marginal edge portions bent inwardly so as to form a pair of oppositely disposed sides 33, 33 and a pair of oppositely disposed top and bottom members 34 and 35. The opposite end portions of each of the side members 33, 33 are welded to a respective one of the opposite end portions of the top and bottom members 34 and 35, as at 36, 36. The lower back portion of the primary header may be enclosed by means of a plate 37, while the upper portion may be similarly enclosed by a second plate 38. Each of these plates is appropriately welded to the edge portions of the header proper so as to form an enclosed header box. If desired, a single plate may be employed in lieu of the plates 37 and 38.

Referring particularly to Figs. 3 and 7, the forward face 32 of the primary header 31 is provided with a burner-receiving opening about which is suitably secured a burner mounting plate 39. The mounting plate 39 is apertured as at 40 so as to receive the blast tube of an oil or gas burner, such as shown at 80, Fig. 1, while the forward face portion of this member is provided with apertures 41 for receiving bolts 42 which are adapted to secure the burner mechanism to the plate 39. The upper portion of the header plate 32 may be provided with a hollow cylindrical box 43 which communicates directly with the inner portion of the header box and which is provided with an aperture 44 for the purpose of receiving a control instrument, as will be hereinafter described in more detail.

Referring particularly to Figs. 2, 3, and 4, the lower back plate 37 of the primary header is apertured so as to receive the open end of a horizontally elongated combustion cylinder 45, the other end portion of which is closed over as at 46. This combustion cylinder may be suitably welded to the back plate 37 as at 47, while its enclosed end portion 46 may be provided with a cylindrical inspection tube 48. As may be best seen in Fig. 3, this inspection tube 48 may be closed over by means of a removable inspection plug which is generally designated by the numeral 49.

Concentrically disposed within the combustion cylinder 45 is an open-ended firebox cylinder 50 which has one of its end portions suitably secured within the burner-receiving opening of the front header plate 32. More specifically, the firebox cylinder 50 may be welded to the front header plate 32, as at 51. The other end portion of the firebox cylinder terminates intermediate the end portions of the combustion chamber cylinder, and may have its marginal edge portion beaded back on itself, as at 52. Adjacent the inside portion of the burner mounting plate 39, there may be provided a ceramic fire-resisting ring 53 which is provided with an opening 54 which is adapted to fit snugly about the blast tube of a burner in the conventional fashion.

As may be best seen in Figs. 2, 3 and 4, the heat exchanger unit 11 also includes a secondary header box which is designated by the numeral 55. This secondary header box comprises a main plate 56, the marginal edge portions of which are bent inwardly and are welded together at their corners in the same manner as was described in connection with the primary header 31. Welded to the inner portion of the secondary header 55 is a single inner plate 57, while the main plate 56 is provided with a central opening in which is secured a stack connection ring, or conduit, 58. The lower portion of the secondary header 55 is connected to the upper portion of the combustion cylinder 45 by means of a bracket 59.

The primary and secondary header boxes 32 and 55 have their inner chamber portions interconnected by means of a plurality of flue elements, each of which is designated generally by the numeral 60. Each of these flue elements 60 is hollow, and has one of its end portions extending through an appropriately shaped aperture provided in a respective one of the pair of vertically disposed and horizontally spaced primary and secondary header plates 38 and 57. By referring to Figs. 3, 4 and 5, it is to be understood that by welding one end portion of each flue to its associated header plate, a rigid and gas-tight connection is made between the primary and secondary header boxes.

Each of the individual flue sections 60, 60 comprises a pair of identical corrugated steel stampings 61 and 62 which are placed together with their corrugations in phase and then welded at their opposite side portions 63 so as to form an open-ended flue having a tortuous gas-conducting passageway 64 therein. Broadly, each flue section 60 is shaped as a flattened tube, and since these flues provide tortuous gas-conducting passageways therethrough, there is no need to provide the various flue elements with any auxiliary baffle plates. By thus forming each flue element in this manner, the two halves 61 and 62 may be inexpensively stamped from the same die and, furthermore, since the opposite side portions 63, 63 are left in an uncorrugated condition, the flue halves may be readily welded together by automatic welding equipment. In this latter connection, it is to be understood that the opposite end portions of each flue element are secured to their respective header plates 38 and 57 by means of a bead of welding material 65 which is disposed about the flue element and at the juncture of the flue element and the header plate. As each of these flues is corrugated substantially throughout its entire length, it is clear that they all present an extremely large surface area for heat exchange purposes. The apertures in the header plates 38 and 57 which are adapted to receive the end portions of the flues 60, 60 may be appropriately and readily formed in such plates in a single die set.

From the above, it is to be understood that the primary and secondary header boxes 31 and 55 are secured rigidly together by means of the various flue elements 60, 60, while the combustion cylinder 45 and the firebox cylinder 50 are rigidly carried by the primary header box 31 so that a unitary header, combustion chamber and flue element structure is provided. Referring particularly to Figs. 2 and 3, it is to be noted that the bottom portion of the primary header 31 is provided with a pair of leveling and anchoring bolts 66, 66, while the rear portion of the combustion cylinder 45 is provided with a similar leveling and anchoring bolt 67. These three bolts may be used for anchoring the entire unitary heat exchanger structure to the blower framework, in a manner as best illustrated in Figs. 2 and 4. More specifically, each of these bolts may be provided with a pair of locking nuts 68, 68 which function adjustably to lock the bolt directly to the blower frame platform member 15.

A gun type oil burner or a conventional type gas burner, as shown at 80, Fig. 1, is secured to the burner mounting plate 39 so that the combustion nozzle of the burner will project into the firebox cylinder 50 in the usual manner. From this, it will be understood that the oil or gas emanating from the burner nozzle will be burnt within the confines of the burner cylinder 50, and the products of combustion will pass from the cylinder 50 into the combustion cylinder 45. As best shown in Fig. 3, these products of combustion, in the form of hot gases, will pass lengthwise of the cylinder 45 towards the primary header box 31 in which they will move in a vertical direction so as to enter the various baffle elements 60, 60, from which they will be conducted to the secondary header box 55. A conventional chimney stack connected with the stack connector ring 58 will conduct the gases to the chimney and thus subsequently to atmosphere.

As is best disclosed in Fig. 1, the present heating apparatus is adapted to be totally enclosed within insulated panels which are removably secured about the apparatus. More specifically, the present apparatus is provided with a pair of upstanding side panels 69, only one of which is illustrated herein, and a pair of front and rear panels of which only the front panel 70 is illustrated. The front panel 70 extends downwardly from the upper portion of the heating apparatus to substantially the mid-portion thereof, and the lower front portion of the unit is adapted to be covered by means of a removable panel or door 71. Each of these panels, with the exception of the removable door 71, is adapted to be secured to the blower framework by means of screws or bolts 72, 72. It is to be particularly noted that the side panel 69 is provided with an opening in its lower portion in which is mounted an air filter generally designated by the numeral 73. This filter is provided for the purpose of cleaning the air before the latter reaches the air blower. Still referring to Fig. 1, it is to be understood that each of the insulated panel units comprises a relatively heavy metallic side wall against the inner side of which is secured insulating material generally designated by the numeral 74. A thin sheet of heat-reflecting aluminum foil 75 is adhesively secured over the insulating material 74. The upper portions of the front, side and back panels are secured together by means of a substantially rectangular-shaped cap element 76, the top portion of which is apertured and provided with a connecting frame 77 for the purpose of connecting the heating apparatus with the usual hot air conduit system of a residental house.

From the above, it will be understood that the air blower is adapted to draw air from the outside of the heating apparatus and through the filter 73, and thereafter it will force the air in a vertical direction through the conduit 27 which in turn will direct the air upwardly and about the combustion cylinder 45. Thereafter, the air will continue to be directed upwardly and between and about the various flue elements 60, 60, and finally through the opening in the cap 76, so as to be circulated throughout a building which is to be heated. Referring particularly to Fig. 6, it will be noted that the opening 26 in the table member 15 is disposed directly beneath the combustion cylinder 45 (shown by phantom lines 45′) and thus, the air from the blower will be forced into intimate contact with the entire surface of the cylinder 45, to the end that the combustion cylinder itself functions as a relatively efficient heat exchanger unit. If desired, a pair of air directing baffles 78, 78 may be mounted upon the blower table 59 in a manner as best disclosed in Figs. 2, 4 and 6. Each of these baffles 78 comprises a substantially rectangular-shaped member, the lower portion of which may be bent over as at 79 and secured to the table 15 by means of the bolts 29. In this connection, it will be noted that in Fig. 2, only one of these baffle members 78 is disclosed, the other member being omitted so that the remaining elements of the heat exchanger may be seen more clearly. Referring particularly to Figs. 4 and 6, it will be noted that these baffle members 78, 78 function to direct the air from the blower directly to and about the various flue elements 60, 60. In other words, these baffle members tend to straighten out the flow of air and to prevent any useless eddying of the air at the juncture of the table top 15 and the insulated side panels 69, 69 of the unit.

Fig. 1 illustrates the furnace in its completed form with a conventional gun type oil burner 80 secured to the mounting plate 39 by means of bolts 42. A primary control unit 81 may be provided upon the outside of the front panel 70 so that a portion of the control element passes through an aperture formed in the panel and into the primary header chamber through its aperture 44 formed in the box 43. Also a combination blower and limit control instrument 82 may be mounted upon the front panel 70 with a portion thereof projecting into the furnace chamber over the primary header through an appropriate aperture formed in the panel 70. All of these protective and control instruments and the burner 80 may be properly connected to an electrical system in a conventional manner.

From the above, it is manifest that the present invention provides a warm air furnace which is extremely compact but which, at the same time, provides a heat exchanger unit having a relatively large surface over which the air to be heated may circulate. The present heating apparatus is constructed essentially as two basic unitary structures including an air blower 10 and a heat exchanger 11, which two structures may each be completely prefabricated and tested at the factory and then be, if desired, shipped in an individual crate to the purchaser's home. The panels may be shipped in a knocked-down condition so that all of the various component elements of the furnace may be conveniently and inexpensively handled from a marketing standpoint. Furthermore, it should be understood that since the heat exchanger structure 11 is completely self-contained, it may be properly tested at the factory without the necessity of setting up the entire furnace structure. Once the blower and heat exchanger units, along with the various insulated panels, have been received at a purchaser's home, the heat exchanger unit may be quickly mounted upon the blower frame and thereafter, the various panels may be readily bolted in place, thereby substantially to complete the furnace structure. Quite obviously, relatively unskilled workers only are required for so assembling the present heating apparatus.

On the other hand, if desired, the present heating apparatus may be completely assembled, with or without its panels, and be thus shipped to the purchaser, for even when so assembled, the complete apparatus is so compact that it may be readily and conveniently handled.

I claim:

1. A unitary heat exchanger structure adapted for insertion in a hollow furnace shell, said structure comprising, a relatively thin vertically elongated primary header box including spaced vertical front and back walls provided at their lower portions with a pair of aligned apertures, a combustion chamber in the form of a horizontally elongated hollow box with one open end portion, said combustion chamber having its open end secured within the back wall opening of said primary header so that the body portion of said combustion chamber will extend outwardly from such back wall, a secondary header box having a stack tube connected therewith and disposed in horizontally spaced relation with the back wall of said primary header, and a plurality of individual hollow flue elements connecting said primary and secondary headers so as to be disposed above and in substantially parallel relation with said combustion chamber.

2. A unitary heat exchanger structure adapted for insertion in a hollow furnace shell, said structure comprising, a relatively thin vertically elongated primary header box including spaced vertical front and back walls provided at their lower portions with a pair of aligned apertures, an open ended and horizontally elongated cylindrical firebox having one end thereof secured within the front wall opening of said primary header with its body portion extending horizontally through and beyond the back wall opening of said primary header, a cylindrical and horizontally elongated combustion chamber having a closed end and an open end of which the latter is secured directly within the back wall opening of said primary header so that its body portion extends horizontally from said primary header in spaced concentric relation with said firebox cylinder, a secondary header box having a stack tube connected therewith and disposed in horizontally spaced relation with the back wall of said primary header, and a plurality of individual hollow flue elements connecting said primary and secondary headers so as to be disposed above and in substantially parallel relation with said combustion chamber.

3. A heating apparatus comprising, a relatively thin vertically elongated primary header box including spaced vertical front and back walls provided at their lower portions with a pair of aligned apertures, a combustion chamber in the form of a horizontally elongated hollow box with one open end portion, said combustion chamber having its open end secured within the back wall opening of said primary header so that the body portion of said combustion chamber will extend outwardly from such back wall, a secondary header box having a stack tube connected therewith and disposed in horizontally spaced relation with the back wall of said primary header, a plurality of individual hollow flue elements connecting said primary and secondary headers so as to be disposed above and in substantially parallel relation with said combustion chamber, and a vertically disposed hollow shell with a burner-receiving opening therein disposed about said header and combustion chamber elements with the burner-receiving opening disposed in alignment with the front wall opening of said primary header.

4. In a heating apparatus having a hollow vertically disposed shell with a burner-receiving opening in the vertical wall portion thereof; the combination therewith of a unitary heat exchanger structure comprising, a relatively thin vertically elongated primary header box including spaced vertical front and back walls provided at their lower portions with a pair of aligned apertures, said primary header box being adapted to be positioned within said shell with the front wall aperture aligned with the burner-receiving opening, a combustion chamber in the form of a horizontally elongated hollow box with one open end portion, said combustion chamber being carried by said primary header with the open end of said combustion chamber being secured directly within the opening of said back wall, a secondary header box having a stack opening therein and disposed in horizontally spaced relation with the back wall of said primary header, and a plurality of individual hollow flue elements connecting said secondary header to said primary header so as to be disposed above and in substantially parallel relation with said combustion chamber.

5. A heating apparatus comprising, a relatively thin vertically elongated primary header box including spaced vertical front and back walls provided at their lower portions with a pair of aligned apertures of which the back wall aperture is of a diameter substantially greater than that of said front wall aperture, an open ended and horizontally elongated cylindrical firebox having one end thereof secured within the front wall opening of said primary header with its body portion extending horizontally through and beyond the back wall opening of said primary header, a cylindrical and horizontally elongated combustion chamber having a closed end and an open end of which the latter is secured directly within the back wall opening of said primary header so that its body portion extends horizontally from said primary header in a spaced concentric relation with said firebox cylinder, a secondary vertically elongated and relatively thin header box having a stack tube connected therewith and disposed in horizontally spaced relation with the back wall of said primary header, a plurality of individual hollow flue elements connecting said primary and secondary headers so as to be disposed above and in substantially parallel relation with said combustion cylinder, and a vertically disposed hollow shell with a burner-receiving opening therein disposed about said header and combustion cylinder elements with the burner-receiving opening disposed in alignment with the front wall aperture of said primary header.

6. A heating apparatus comprising, a relatively thin vertically elongated primary header box including spaced vertical front and back walls provided at their lower portions with a pair of aligned apertures of which the back wall aperture is of a diameter substantially greater than that of said front wall aperture, an open ended and horizontally elongated cylindrical firebox having one end thereof secured within the front wall opening of said primary header with its body portion extending horizontally through and beyond the back wall opening of said primary header, a cylindrical and horizontally elongated combustion chamber having a closed end and an open end of which the latter is secured directly within the back wall opening of said primary header so that its body portion extends horizontally from said primary header in a spaced concentric relation with said firebox cylinder, a secondary vertically elongated and relatively thin header box having a stack tube connected therewith and disposed in horizontally spaced relation with the back wall of said primary header, a plurality of individual gas-conducting flue elements connecting said primary and secondary headers so as to be disposed above and in parallel relation with said combustion cylinder, each of said flue elements having the general shape of a flattened tube with the two opposing side walls thereof being corrugated transversely of the tube length thereby providing a tortuous gas-conducting passageway therethrough, and a vertically disposed hollow shell with a burner-receiving opening therein disposed about said header and combustion elements with the burner-receiving opening disposed in alignment with the front wall aperture of said primary header.

7. In a heating apparatus having a hollow vertically disposed shell with a burner-receiving opening in the vertical wall portion thereof; the combination therewith of a unitary heat exchanger structure comprising, a relatively thin vertically elongated primary header box including spaced vertical front and back walls provided at their lower portions with a pair of aligned apertures, said primary header box being adapted to be positioned within said shell with the front wall aperture aligned with the burner-receiving opening, a horizontally elongated cylindrical combustion chamber box having one closed and one open end with the open end thereof being secured directly within the back wall opening of said primary header, a secondary hollow header box having a stack opening therein and disposed in horizontally spaced relation with the back wall of said primary header, and a plurality of individual gas-conducting flue elements connecting said secondary header to said primary header, each of said flue elements having the general shape of a flattened tube with the two opposing side walls thereof being corrugated transversely of the tube length thereby providing a tortuous gas-conducting passageway therethrough.

8. A heating apparatus comprising, a relatively thin vertically elongated primary header box including spaced vertical front and back walls provided at their lower portions with a pair of aligned apertures, a combustion chamber in the form of a horizontally elongated hollow box with one open end portion, said combustion chamber having the open end secured within the back wall opening of said primary header so that the body portion of said combustion chamber will extend outwardly from such back wall, a secondary hollow header box having a stack tube connected therewith and disposed in horizontally spaced relation with the back wall of said primary header, a plurality of individual hollow flue elements connecting said primary and secondary headers so as to be disposed above and in substantially parallel relation with said combustion chamber, an air blower, air-conducting means located directly beneath said combustion chamber box for directing air from said air blower upwardly about said combustion chamber box and vertically past said individual flue elements, and a vertically disposed hollow shell with a burner-receiving opening therein disposed about said header and combustion chamber elements with the burner-receiving opening disposed in alignment with the front wall opening of said primary header.

9. A heating apparatus comprising; a unitary air supply structure including an open framework, an air blower disposed within said framework, and air-conducting means for directing air from said blower in a substantially vertical direction through the top of said framework; a unitary heat exchanger structure adapted to be mounted upon the top of said framework, said last mentioned structure including a relatively thin vertically elongated primary header box with front and back walls provided at their lower portions with a pair of aligned openings, a horizontally elongated combustion chamber in the form of a hollow box with one open end which is secured within the back wall opening so that the body portion of such box projects away from said primary header and directly over said air-conducting means, a secondary header box having a stack tube opening and disposed in horizontally spaced relation with the back wall of said primary header, and a plurality of individual hollow flue elements connecting said secondary header with said primary header so that said flues are disposed over said combustion chamber box; and a vertically disposed shell having a burner-receiving opening and disposed about said unitary heat exchanger structure so that the burner-receiving opening is in alignment with the front wall opening of said primary header.

10. A heating apparatus comprising; a unitary air supply structure including an open framework, an air blower disposed within said framework, and air-conducting means for directing air from said blower in a substantially vertical direction through the top of said framework; a unitary heat exchanger structure adapted to be mounted upon the top of said framework, said last mentioned structure including a relatively thin vertically elongated primary header box with horizontally spaced front and back vertical walls provided at their lower portions with a pair of aligned openings of which the back wall opening is of a diameter substantially greater than that of said front wall opening, an open ended and horizontally elongated cylindrical firebox having one end thereof secured within the front wall opening of said primary header with its body portion extending horizontally through and beyond the back wall opening, a horizontally elongated cylindrical combustion chamber having a closed end and an open end of which the latter is secured directly within said back wall opening so that its body portion extends horizontally from said primary header in spaced concentric relation with said firebox cylinder and over said air-conducting means, a secondary header box having a stack tube opening and disposed in horizontally spaced relation with the back wall of said primary header, and a plurality of individual hollow flue elements connecting said secondary header with said primary header so that said flues are disposed over said combustion chamber box; and a vertically disposed shell having a burner-receiving opening and disposed about said heat exchanger structure so that the burner-receiving opening is in alignment with the front wall opening of said primary header.

11. A heating apparatus comprising; a unitary air supply structure including an open framework, an air blower disposed within said framework, and air-conducting means for directing air from said blower in a substantially vertical direction through the top of said framework; a unitary heat exchanger structure adapted to be mounted upon the top of said framework, said last mentioned structure including a relatively thin vertically elongated primary header box with horizontally spaced front and back vertical walls provided at their lower portions with a pair of aligned openings, a combustion chamber in the form of a horizontally elongated hollow box with one open end which is secured within the back wall opening so that the body portion of such box projects away from said primary header and directly over said air-conducting means, a secondary header box having a stack tube opening and disposed in horizontally spaced relation with the back wall of said primary header, and a plurality of individual hollow flue elements connecting said secondary header with said primary header so that said flues are disposed over said combustion chamber box; and vertically disposed insulated front, back and two side panels removably securable about said unitary heat exchanger structure, said front panel being provided with a burner-receiving opening and being disposed about said last mentioned structure so that said burner-receiving opening is in alignment with the front wall opening of said primary header.

WARREN H. DE LANCEY.

REFERENCES CITED

The following references are of record in the file of this patent:

UNITED STATES PATENTS

| Number | Name | Date |
|---|---|---|
| 1,527,679 | Frost | Feb. 24, 1925 |
| 1,644,180 | Croan | Oct. 4, 1927 |
| 2,220,604 | Jepertinger | Nov. 5, 1940 |
| 2,353,606 | Watts | July 11, 1944 |
| 2,376,140 | Henderson | May 15, 1945 |
| 2,448,595 | Holbrook | Sept. 7, 1948 |